United States Patent [19]

Eisen

[11] Patent Number: 4,591,696
[45] Date of Patent: May 27, 1986

[54] ELECTRIC SOLDERING GUN WITH WORK CLAMPING DEVICE FOR THE SOLDERING TIP

[76] Inventor: Mark B. Eisen, 567 Deloraine Avenue, Toronto, Canada, M5M 2C5

[21] Appl. No.: 654,414

[22] Filed: Sep. 26, 1984

[51] Int. Cl.⁴ ............................ B23K 3/02; H05B 3/00
[52] U.S. Cl. .................................... 219/230; 219/235; 219/240; 228/51
[58] Field of Search ............... 219/227, 229, 230, 233, 219/235, 236, 237, 240; 228/51–55, 57

[56]  References Cited
U.S. PATENT DOCUMENTS

| 2,469,877 | 5/1949 | Haberman | 219/230 X |
| 2,514,736 | 7/1950 | Zana et al. | 219/230 |
| 2,680,187 | 6/1954 | Anton | 219/235 |
| 2,751,485 | 6/1956 | Sauer | 219/230 X |
| 3,152,239 | 10/1964 | Faulconer | 219/240 X |
| 3,339,059 | 8/1967 | Spinka | 228/51 X |
| 3,529,760 | 9/1970 | Hickman et al. | 228/51 |

FOREIGN PATENT DOCUMENTS 1452005  10/1976  United Kingdom .................. 228/51

Primary Examiner—A. Bartis

[57] ABSTRACT

An electric soldering gun of the type having a resistance heating element defining a soldering tip and extending outwardly from a pair of cylindrical terminal posts projecting from the front end of a cylindrical housing and further having a handle extending downwardly from the housing is provided at the upper front end with a trigger operated switch for selectively energizing the heating element and a light at the front end of the housing for illuminating the soldering tip. A clamping device cooperative with the soldering tip is provided for clamping the work being soldered during use of the soldering gun. The clamping device includes a clamping member pivotally supported on one of the terminal posts and having a clamping tip movable toward and away from the soldering tip. A clamping member actuating trigger is pivotally supported on the housing adjacent to the trigger of the switch and is connected to the clamping member for movement of the clamping member toward the soldering tip as the clamping member actuating trigger is depressed simultaneously with actuation of the trigger of the switch. The clamping device secures the work being soldered and allows more efficient conduction of heat from the tip to the work.

1 Claim, 6 Drawing Figures

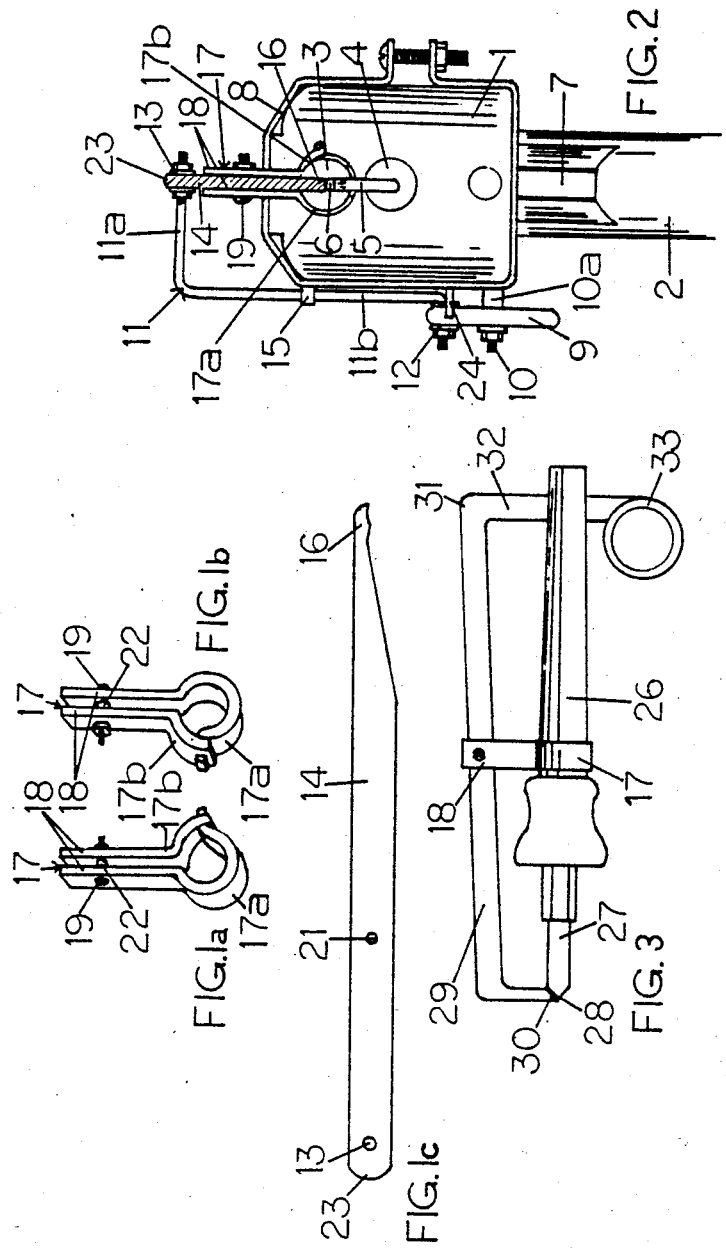

ELECTRIC SOLDERING GUN WITH WORK CLAMPING DEVICE FOR THE SOLDERING TIP

This invention relates to a clamping device for a soldering tool.

Soldering tools are commonly employed for soldering connections between wires and electronic components, for example in printed circuit boards or other devices. Such soldering tools, being capable of applying heat locally, are effective for soldering such connections and facilitating the removal of soldered connections without heating the surrounding area.

A disadvantage of soldering tools is that the user must use one hand to hold the tool and the other hand to apply the solder to the work when heated. The heating tip and the work must meet for a length of time sufficient to heat the work to a desired temperature above the melting point of the solder. Thus, if the work is not secured or fixed in place, it is difficult for the user to manipulate the soldering tool and solder so as to adequately apply heat to the work, and apply the solder to form a good connection, since the user does not have a free hand to steady the work. This disadvantage is particularly acute when soldering loose wires in relatively inaccessible places, such as when installing audio equipment or alarm circuitry into an automobile or other structure.

The present invention provides a soldering gun having an approximately cylindrical housing, cylindrical terminal posts projecting axially from a front end of the housing supporting a heating element extending parallel to the cylindrical terminal posts, a handle extending at approximately a right angle to the axis of the housing from a lower side of the housing, a heating element-actuating trigger at the upper end of a front side of the handle for activating the heating element, a light on the front end of the housing which illuminates the tip of the heating element when the heating element-actuating trigger is depressed, and a clamping device comprising a clamping member pivotally supported on one of the cylindrical terminal posts of the soldering gun, a clamping member-actuating trigger pivotally supported adjacent to the heating element-actuating trigger of the soldering gun and a connecting rod connecting the clamping member-actuating trigger to the clamping member so that the clamping member moves toward the heating element as the clamping member-actuating trigger is depressed.

The clamping device can be adapted to be attached on the soldering tool or can be built into the soldering tool. In either case, the clamping member is adapted to move towards the soldering tip at the desired moment, clamping the work in place between the clamping member and the soldering tip. This secures the work and allows for the more efficient conduction of heat between the heating tip and the work by applying pressure between the surface of the work contacting the heating tip and the heating tip itself.

In the drawings that illustrate preferred embodiments of the invention;

FIG. 1 is a side view of one form of clamping device, removably mounted on a soldering gun, from the side bearing the actuating means;

FIGS. 1a and b are views in perspective of the collar and support posts with fastening member in FIG. 1;

FIG. 2 is a front view of the gun of FIG. 1; and

FIG. 3 is a side view of a second form of clamping device removably mounted on a soldering iron.

Figure 1:
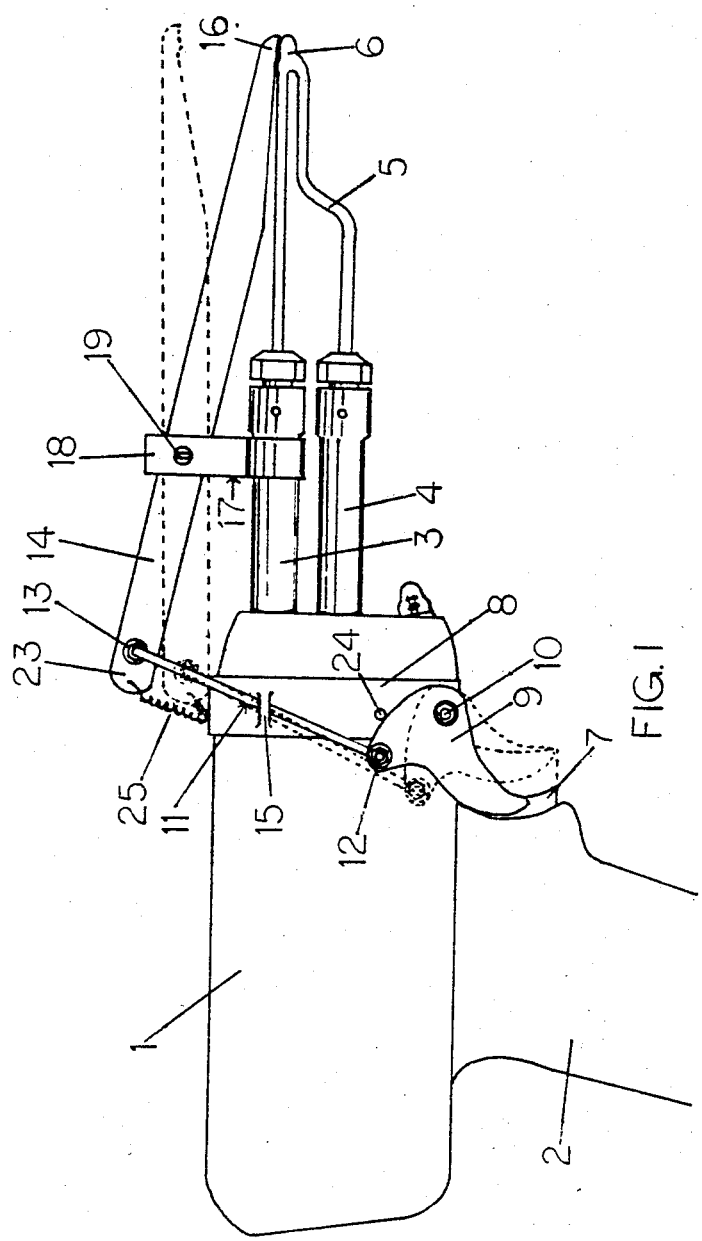
FIG. 1c is a side view of the clamping member in FIG. 1.

Referring to the drawings, wherein like reference numerals indicate like parts, FIGS. 1 and 2 show a conventional soldering gun having a housing 1, an approximately cylindrical handle 2, upper and lower cylindrical terminal posts 3, 4 extending from the front of the housing and supporting a heating element 5 having a tip 6, sometimes referred to herein as a "heating tip". A handle is provided with a heating element-actuating trigger 7 which, when squeezed by the user, closes a switch, activating the soldering gun and causing the heating element to become hot and a light on the front end of the housing to illuminate the heating tip. An electrical cord (not shown) extends from the base of the handle.

In a detachable form of clamping device, a strap 8 is secured to the housing in front of the trigger 7. The strap 8 is preferably composed of a material such as plastic or metal. A trigger 9 is pivotally mounted to the strap 8 by means of a pin or other suitable fastening member 10, which may include a spacer 10a, such that the trigger 9 can pivot freely between an open position shown in broken lines in FIG. 1 and a clamping position shown in solid lines in FIG. 1. The trigger 9 may be mounted on either side of the soldering gun, depending upon the user's preference, and a right-sided mount is illustrated in FIGS. 1 and 2. The trigger 9 should preferably be mounted on the strap 8 adjacent to and in alignment with the trigger 7 of the soldering gun. The user can thus operate both the trigger 7 and the trigger 9, or either alone, with one finger. The trigger 9 is preferably composed of plastic or other thermally insulating material.

A link such as an L-shaped connecting rod 11, preferably of metal, has a vertical arm 11b, the lower end of which is pivotally connected to a hole 12 in the trigger 9 and a horizontal arm 11a, the free end of which is pivotally connected to a hole 13 in the clamping member 14. The length and shape of the connecting rod 11 is determined by the distance between the holes 12, 13 such that the connecting rod can move freely between the open and clamping positions shown in broken and solid lines, respectively, in FIG. 1, while the vertical arm 11b of the connecting rod 11 remains approximately aligned with a side of the strap 8. This may be facilitated by providing a guide 15 comprising a bight of material struck outwardly from the strap 8 through which the vertical arm 11a of the connecting rod 11 may be inserted and which permits free vertical movement of the connecting rod. The clamping member 14 is composed of metal or other material which will confer adequate rigidity on the clamping member 14 and will withstand the heat of the tip 6. The clamping tip 16 of the clamping member is preferably shaped to conform to the upper edge of the tip 6 of the heating element 5 so that the lower edge of the clamping tip 16 abuts contiguously with the upper edge of the tip 6 when the clamping member 14 is in the clamping position shown in solid lines in FIG. 1.

A collar 17 or other securing means may be secured to the upper terminal post 3 of the soldering gun. The collar has at least one support post 18 extending upwardly and suitable for supporting the clamping member 14 during use. Two support posts 18 are preferred to minimize lateral movement of the clamping member 14. The collar 17 and support posts 18 may be an integral piece, either permanently affixed to or removable from the terminal post 3, or they may be separate pieces 17a, 17b linked or joined together to facilitate installation and removal. The collar 17 and support posts 18 should be composed of metal or other heat-resistant material.

The clamping member 14 is pivotally fastened to the support posts 18 by means of a pin 19 or other fastening member extending through a hole in each of the support posts 18 and a hole 21 in the clamping member 14. The hole 21 may be adapted for the insertion of a spacer 22 which may be inserted over the pin 19 between the support posts 18 to space these apart and permit the clamping member 14 to pivot freely therebetween. The support posts 18 should be as close together as possible in order to minimize lateral movement of the clamping member 14 while allowing the clamping member 14 to pivot freely therebetween.

The holes in the support posts 18 should be at a height which will allow for sufficient clearance between the rear end 23 of the clamping member 14 and the housing 1 of the soldering gun when the clamping member 14 is in the clamping position so that the clamping member 14 may be pivoted to the open position in which the clamping tip 16 and the tip 6 of the heating element 5 are spaced from one another to permit insertion of the work therebetween.

It may be beneficial to have the connecting rod 11 sufficiently flexible that the horizontal arm 11a can flex resiliently downwardly relative to the vertical arm 11a if excessive pressure is applied to the trigger 9, to prevent such pressure being applied by the clamping tip 16 to the tip 6 of the heating element 5 that the heating element 5 is deformed. Inadvertent deformation of the heating element 5 can also be prevented by providing on the strap 8 a trigger stop in the form of a projection 24 which engages the upper side of the trigger 9 when the trigger 9 is pivoted to the clamping position and prevents movement of the trigger 9 beyond the clamping position. If the connecting rod 11 is too resilient, however, it may unduly diminish the force which can be applied between the clamping tip 16 and the tip 6 of the heating element 5, rendering the clamping member 14 incapable of securing the work effectively.

A tension spring 25 or other resilient means biasing the clamping member to the open position may be mounted between the clamping member 14 and the strap 8. As shown in FIG. 1, this may be accomplished by affixing one end of the spring to the rear end 23 of the clamping member 14 and the other end of the spring to the strap 8.

In a non-removable form of clamping device, the trigger 9 may be pivotally mounted directly to the housing 1, preferably positioned as aforesaid, either within or outside of the housing 1. The housing 1 is adapted accordingly to permit free vertical movement of the connecting rod 11.

FIG. 3 shows a conventional soldering iron having a handle 26, a heating element 27 and a tip 28. An electrical cord (not shown) extends from the rear of the handle. A second form of clamping device comprises a collar 17 and support posts 18, upon which is pivotally mounted a clamping member 29. The clamping member 29 has the lower edge of its clamping tip 30 conforming to the tip 28 of the heating element 27 such that the lower edge of the clamping tip 30 abuts contiguously with the tip 28 of the heating element 27 when the clamping member 29 is in the clamping position. The clamping member 29 may be further adapted to be actuated by one finger by connecting to the rear end 31 of the clamping member 29 an actuating bar 32 which may for convenience have a finger grip 33.

What I claim is:

1. A soldering gun having an approximately cylindrical housing, cylindrical terminal posts projecting axially from a front end of the housing supporting a heating element extending parallel to the cylindrical terminal posts, a handle extending at approximately a right angle to the axis of the housing from a lower side of the housing, a heating element-actuating trigger at the upper end of a front side of the handle for activating the heating element, a light on the front end of the housing which illuminates the tip of the heating element when the heating element-actuating trigger is depressed, and a clamping device comprising:
    a clamping member pivotally supported on one of the cylindrical terminal posts of the soldering gun;
    a clamping member-actuating trigger pivotally supported adjacent to the heating element-actuating trigger of the soldering gun; and
    a connecting rod connecting the clamping member-actuating trigger to the clamping member so that the clamping member moves toward the heating element as the clamping member-actuating trigger is depressed.

* * * * *